UNITED STATES PATENT OFFICE.

JAMES R. SMITH, OF CHICAGO, ILLINOIS, ASSIGNOR TO HENRY C. BUHOUP, OF SAME PLACE.

FIRE-EXTINGUISHING COMPOUND.

SPECIFICATION forming part of Letters Patent No. 314,886, dated March 31, 1885.

Application filed March 2, 1885. (No specimens.)

*To all whom it may concern:*

Be it known that I, JAMES R. SMITH, of the city of Chicago, in the county of Cook and State of Illinois, have invented a new and useful Compound for Extinguishing Fires, of which the following is a clear and exact description.

The object of my present invention is the furnishing of a compound for the above purpose which may be handled or stored in any convenient vessel or package without any necessity to hermetically seal the vessel or package, which compound, though kept continuously in either a very high or a very low temperature, will not by evaporation either lose any of its antiphlogistic qualities, or vitiate the surrounding atmosphere, or precipitate obnoxious gases or salts upon adjacent articles, in which compound no chemical reaction takes place until subjected to a temperature of about 200° Fahrenheit, which will not crystallize at any ordinary low temperature to such an extent as to either destroy the antiphlogistic qualities of the liquid or prevent its free use through any ordinary hose or nozzle, and which, when subjected to fire heat, will freely give off both light and heavy gases, expanding in all directions, which gases, aided by the smothering incrustation of the salt of the liquid, will immediately extinguish the fire.

The compound which I have invented and discovered accomplishes to a greater or less extent each and every the objects named; and it consists, essentially, of the solution, in any convenient quantity of water, of sulphite or hyposulphite of soda with muriate of ammonia. I prefer hyposulphite of soda to sulphite of soda, because it is cheaper and because it is stronger, it being one of the principal features of my compound, which gives it great advantages and distinguishes it from compounds which slightly resemble it which have been heretofore patented or used, that this compound may be made of any desired strength without danger of its destroying itself by evaporation, either before it is securely sealed or by reason of imperfect sealing, and without danger of its losing its gases while being projected upon the fire. To these essential elements I prefer to add a quantity of common rock-salt, partly to reduce the temperature at which the mixture will freeze, and partly because I have discovered that adding rock-salt to the essential elements named increases the incrustation or smothering effect upon the fire which is produced by liberating the gases and precipitating the salts of said essential elements.

I am aware that for the purpose of extinguishing fire by liberating from solutions gases which are obnoxious to combustion (1) muriate of ammonia has been used, and (2) sulphite and hyposulphite of soda, either singly or mixed, have been used, and (3) salts of ammonia, in combination with other salts which produce carbonate of ammonia, have been used, and I do not claim either of the three solutions just named. Every compound or mixture for this purpose which has been heretofore patented or used, so far as I am aware, excepting the simple and by itself practically ineffective solution of muriate of ammonia in water, is subject to spontaneous evaporation, and to the necessity of being hermetically sealed, and to the manufacture and use with it of special vessels, packages, or pumps, and both before it is sealed and by reason of imperfect sealing, and while it is being precipitated upon the fire, will very rapidly lose in large proportions the gases which make it effective.

I have ascertained by abundant experiments that in my present compound no appreciable evaporation or other chemical reaction, though it be for a long time exposed, takes place until it has been raised to a temperature of about 200° Fahrenheit, and I have used the mixture effectively when it was at a temperature of 25°. When the solution by contact with fire becomes heated to or above 200° Fahrenheit, a mixture of sulphurous acid (sulphur dioxide) and ammonia is given off in large quantity. The mixed gases, it is found, are much more efficient and rapid in extinguishing fire (each assisting or co-operating with the other) than either separately. It is probable that the ammonia acts as a carrier of the sulphurous acid, diffusing it more rapidly; but whatever the action I have discovered and proved by practical trial that the mixed gases are more efficient and rapid in their action than either alone.

So far as I am aware a compound stable at ordinary temperatures, but giving off, when heated to a high temperature, and then only, a mixture of ammonia and sulphurous acid, has never been produced or used except since my invention. In my compound the muriate of ammonia is not added to the sulphite or hyposulphite of soda simply for its own individual antiphlogistic properties, in order to produce a compound having the sum of the properties of the two ingredients, but as a stable source of ammonia which at the time of use shall be given off in admixture with sulphurous acid, and shall assist or supplement the action of the sulphurous acid by serving as a carrier or otherwise.

I do not claim the use of the elements named separately for this purpose, nor limit myself to any proportions of mixture; but

I claim—

The liquid herein described for extinguishing fires, consisting of a solution of sulphite or hyposulphite of soda and of muriate of ammonia.

JAMES R. SMITH.

Witnesses:
P. H. T. MASON,
W. G. RAMEY.

---

It is hereby certified that in Letters Patent No. 314,886, granted March 31, 1885, upon the application of James R. Smith, of Chicago, Illinois, for an improvement in "Fire Extinguishing Compounds," an error appears requiring the following correction, viz: In line 88, page 1, of the printed specification, the clause reading "was at a temperature of 25°," should read *was at a temperature of —25°*; and that the Letters Patent should be read with this correction therein to make it conform to the record of the case in the Patent Office.

Signed, countersigned, and sealed this 21st day of April, A. D. 1885.

[SEAL.]

H. L. MULDROW,
*Acting Secretary of the Interior.*

Countersigned:
M. V. MONTGOMERY,
*Commissioner of Patents.*

It is hereby certified that in Letters Patent No. 314,886, granted March 31, 1885, upon the application of James R. Smith, of Chicago, Illinois, for an improvement in "Fire Extinguishing Compounds," an error appears requiring the following correction, viz: In line 88, page 1, of the printed specification, the clause reading "was at a temperature of 25°," should read *was at a temperature of —25°;* and that the Letters Patent should be read with this correction therein to make it conform to the record of the case in the Patent Office.

Signed, countersigned, and sealed this 21st day of April, A. D. 1885.

[SEAL.] H. L. MULDROW,
*Acting Secretary of the Interior.*

Countersigned:
M. V. MONTGOMERY,
*Commissioner of Patents.*